United States Patent
Barnsley et al.

[11] Patent Number: 5,821,999
[45] Date of Patent: Oct. 13, 1998

[54] METHOD AND SYSTEM FOR FRACTALLY INTERPOLATING INTENSITY VALUES FOR A SINGLE COLOR COMPONENT ARRAY OBTAINED FROM A SINGLE COLOR SENSOR

[75] Inventors: Michael F. Barnsley; David Knight, both of Duluth, Ga.

[73] Assignee: Iterated Systems, Inc.

[21] Appl. No.: 663,642

[22] Filed: Jun. 14, 1996

[51] Int. Cl.⁶ ........................................... H04N 3/14
[52] U.S. Cl. ............................. 348/272; 348/280
[58] Field of Search .................... 348/242, 266, 348/267, 272, 273, 280, 246, 279, 276, 222, 239, 240; 382/163, 167, 264, 300

[56] References Cited

U.S. PATENT DOCUMENTS

| | | |
|---|---|---|
| 4,663,661 | 5/1987 | Weldy et al. . |
| 5,148,497 | 9/1992 | Pentland et al. . |
| 5,373,322 | 12/1994 | Laroche et al. ........................ 348/272 |
| 5,382,976 | 1/1995 | Hibbard ................................ 348/273 |
| 5,398,066 | 3/1995 | Martinez-Uriegas et al. . |
| 5,475,769 | 12/1995 | Wober et al. ........................... 348/242 |
| 5,506,619 | 4/1996 | Adams, Jr. et al. .................... 348/272 |
| 5,596,367 | 1/1997 | Hamilton, Jr. et al. ................ 348/272 |
| 5,629,734 | 5/1997 | Hamilton, Jr. et al. ................ 348/272 |
| 5,652,621 | 7/1997 | Adams, Jr. et al. .................... 348/272 |

*Primary Examiner*—Wendy Garber
*Assistant Examiner*—Gene N. Auduong
*Attorney, Agent, or Firm*—Morris, Manning & Martin, L.L.P.

[57] ABSTRACT

A method of fractally interpolating intensity values for a color component array derived from a single chip charge-coupled-device (CCD) is disclosed. The method includes selection of a domain area about an array element not having a value for the color component array. A plurality of range areas are selected which are larger than the domain area. Additional range areas may be generated by range area transformations and intensity value scaling and shifting. A difference measurement between each domain area and range area is determined and the range area corresponding to the smallest distance measurement is selected. The intensity values of the selected range area are then used to generate an interpolated intensity value for the domain area.

8 Claims, 2 Drawing Sheets

KNOWN GREEN VALUES IN CFA

EIGHT SQUARE ISOMETRIES

METHOD AND SYSTEM FOR FRACTALLY INTERPOLATING INTENSITY VALUES FOR A SINGLE COLOR COMPONENT ARRAY OBTAINED FROM A SINGLE COLOR SENSOR

DESCRIPTION OF THE INVENTION

This invention relates to interpolation of intensity values for picture elements of an image and, more particularly, to interpolating intensity values for array elements in a single color component array.

BACKGROUND OF THE INVENTION

Image capture devices, such as cameras, which use single-chip charge-coupled-devices ("CCD") are well known. These devices include an aperture through which light from the image being captured is transmitted and sensed by a CCD. The CCD is comprised of a plurality of sensor elements. Each sensor element senses the intensity of the light which impinges upon the sensor element. The intensity sensed by each sensor element within the CCD is transferred and stored in a memory or the like for image development. The intensities that are sensed by the sensor elements of the CCD correspond to gray scale values for a black and white image.

To obtain color images from a camera using a single CCD, a color filter array ("CFA") is interposed between the aperture of the camera and the CCD. The color filter array is comprised of a plurality of filter elements in a one to one correspondence with the sensor elements of a CCD. Each filter element allows only one type of colored light to pass through the element. This colored light then strikes a sensor element of the CCD which senses the intensity of the colored light on the sensor element. As a result, the data derived from a sensor element of the CCD has an intensity value and a color identifier since each sensor element corresponds to a color filter element.

Filter elements for a typical CFA normally allow three colors through. The most common colors for a CFA are red-green-blue ("RGB") or luminance-yellow-cyan ("L-Y-C"). By segregating intensity values for the same color into corresponding locations of an array of the same size as the CCD, three incomplete color component arrays are generated for an image. To generate a complete color image, however, a complete color array is required for each color component since the red, green and blue array elements are used to generate a single pixel of a color image. In order to generate intensity values for the undefined color component array elements, interpolation techniques have been developed.

The most common interpolation technique is bilinear interpolation. This interpolation is an average of the four intensity values actually sensed by the CCD which are closest to the undefined array element. This method assumes that the intensity values of the same color in the vicinity of the undefined array element are related to the undefined value. This technique may result in a poor approximation for the array element, especially on textured surfaces and at edges. This problem in interpolating intensities for array elements at these locations arises from the disparity in intensities for neighboring array elements at edges or other uneven surfaces. In effect, the interpolated intensity value becomes a bridge between different structures rather than being absorbed in one structure or the other. The resulting inaccuracy in intensity values may generate an artifact in the image.

An improvement over the bilinear method is disclosed in U.S. Pat. No. 5,382,976 to Hibbard. That patent is directed to the interpolation of array elements for a high frequency color component array. As is well known, the green color components of an RGB color component system, which is sometimes referred to as the luminance components, are thought to be the color component to which the human eye is most sensitive. This sensitivity means that the human eye discerns most of the detail in an image from the green color component or luminance of an image. So that a CCD captures detail to which the human eye responds, most CFAs include at least twice as many green or luminance color filter elements as other color filter elements.

The interpolation technique of U.S. Pat. No. 5,382,976 relies on the dominance of the green component to interpolate the green intensity values for the array elements in the green component array which did not receive a green intensity value that was actually sensed. The technique of this patent classifies the green component array elements having intensity values actually sensed for the green component proximate to the array element for which an intensity value is to be interpolated into a horizontal and a vertical class. The horizontal class is comprised of the intensity values for the array elements which are located on the same row as the array element for which a value is to be interpolated. The vertical class includes the intensity values for the green component which lie in the same column as the array element for which a value is to be interpolated. A gradient is determined for each class and the gradient corresponds to the absolute difference between the intensity values of the array elements in the same class. These gradients are then compared to a threshold. If the gradients for both classes are less than the threshold or if the gradients are both greater than the threshold, then the bilinear interpolation value is computed and used for the array element. If the gradient for only one class is below the threshold value, then only the intensities for the class corresponding to the gradient which is less than the threshold are used to interpolate the array element value. To interpolate array element intensity values for the color components other than green, called chromas in the patent, the interpolated green intensity values are subtracted from the corresponding intensities in a chroma color array. The array elements for which there are no intensity values in the chroma color array are then interpolated using the bilinear method. The resulting intensities for the chroma color component are called color differences in the patent and these are summed with the corresponding intensity values in the green or luminance color component array to obtain intensity values for the chroma color component arrays.

While the technique disclosed in U.S. Pat. No. 5,382,976 improves the image quality over those derived using the bilinear interpolation method alone, artifacts still result in images generated from this method. In particular, color artifacts arise when a gradient comparison results in an interpolated value for a green array element which is lower than it should be to accurately represent the image and the corresponding red or blue component improperly dominates the composite color image. This may be particularly noticeable at edges where an array element should be included in a horizontal or vertical edge but the bilinear interpolations for the elements of the chroma color component array includes intensities in both the horizontal and vertical classes.

Another interpolation technique is disclosed in U.S. Pat. No. 4,642,678 to Cok. That patent discloses a method of interpolation in which a median rather than an average value is used unless the array element for which an intensity value is to be interpolated conforms to a particular pattern. The median value for an array element is obtained by examining the four intensity values for the green or luminance color component proximate to the undefined array element which were actually sensed by the CCD elements. The largest and smallest intensity values are eliminated from the interpolation calculation and the remaining two intensity values are averaged to generate the interpolated value. The two patterns which are otherwise processed are known as stripe and corner patterns. When an intensity value for an array element corresponding to one of these two patterns is interpolated, the interpolation includes a calculation where the median value is reduced by an intensity value average corresponding to intensity values for array elements which are more remote than the four closest ones. While this method includes interpolation of intensity values for array elements at corners or within stripe patterns, the resulting images are still subject to color artifacts.

What is needed is an interpolation method which reduces the occurrence of color artifacts.

What is needed is a method of interpolation which more accurately interpolates values for the chroma color components.

SUMMARY OF THE INVENTION

The above limitations of prior interpolation methods are overcome by a method and system of the present invention. The method of the present invention includes the steps of selecting a domain area in a first color component array defined by a predetermined number of intensity values for the first color which are centered about an undefined array element for the first color component array, selecting a plurality of range areas from the first color component array which is larger than the domain area, determining a difference measurement between the selected domain area and each of the range areas in the plurality of range areas, selecting one of the range areas corresponding to a smallest difference measurement, and interpolating an intensity value for the first color component for the array element about which the domain area is centered. The interpolated value is determined from the intensity values for the first color component in the selected range area. Since the range area is larger than the domain area, more intensity information is available for interpolating an intensity value. Because the domain area and range area are similar, this additional information is more likely to generate an accurate intensity value.

The method of the present invention further includes modifications of the range areas defined by intensity values located within the color component array to provide additional range areas to which the domain area may be more closely matched. These modifications of range areas include rearrangement of the intensity values defining the range area, using different sizes of range areas, scaling of the intensity values defining a range area, and shifting of the intensity values by a shifting factor. Preferably, the shifting factor is a mean average difference between the intensity values of a domain area and a range area. These additional range areas which do not occur in the color component array provide additional match possibilities for the domain areas which were not detected in the image capture process. These additional range areas may result in interpolated values which more closely correspond to the image.

The range areas selected from the color component array may be of different sizes as long as they are larger than the domain area. Intensity values proximate the corners of a range area are used to generate a range area intensity value which is compared to a corresponding intensity value in the domain area. Preferably, the intensity values proximate a range area corner are used in a weighted average to generate an intensity value for the comparison.

Since the intensity values defining a range area are the same as those defining the domain area, the comparison may then be made on a intensity value to intensity value comparison. Preferably, the average of the intensity values is a weighted intensity value which emphasizes the contribution of the intensity value at the corners of the range area over the contribution of intensity values proximate to that corner.

The system which performs in accordance with the method of the present invention includes a memory for the storage of the incomplete color component array and an interpolation processor performing under the control of a computer program. The interpolation processor identifies each array element of the array for which there is no intensity value and performs the above-described method for interpolating the intensity value for the identified array element.

DETAILED DESCRIPTION OF THE INVENTION

Figures 1, 2, 3:
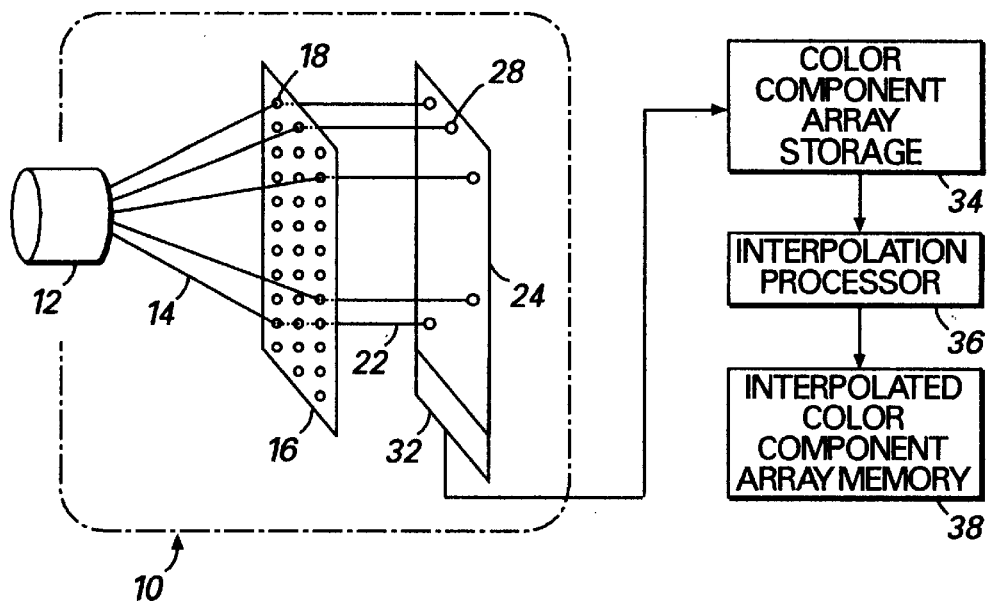
FIG. 1 is a schematic of a camera incorporating the system and method of the present invention.
FIG. 2 is an illustration of a portion of a color component array for which intensity values are to be interpolated.
FIG. 3 is an illustration of range area transformations generated by rearrangement of intensity values.

A simplified camera construction utilizing the system and method of the present invention is shown in FIG. 1. The camera 10 includes an aperture 12 through which light from an image passes. Light rays 14 impinge upon the color filter array (CFA) 16. Each element within CFA 16 allows only one chromatic wavelength of light through. The filtered light rays 22 then strike a single color sensor 24. Preferably, the single color sensor 24 is a charge coupled device ("CCD"). Each sensor element 28 of CCD 24 generates a signal which is indicative of the intensity of the light impinging upon a CCD element. These signals are transferred through sense circuitry 32 to a memory 34 in which the color component arrays are stored. An interpolation processor 38 executing a program implementing the method of the present invention is used to generate interpolated intensity values for array elements in a color component array for which a sensor element 28 in sensor 24 did not sense a color component intensity. The interpolated values may then be stored in memory 34 or alternatively, the color component arrays with the interpolated and actual intensity values may be stored in memory 36 for further processing and use.

An example of a portion of a color component array for the green or luminance color component array is shown in FIG. 2. The method of the present invention is used to interpolate intensity values for the undefined array elements in a color component array such as the portion shown in FIG. 2, for example. The method for interpolating an intensity value requires identifying intensity values already in the area which surround the undefined element to define a domain area. Preferably, the domain area is a 2 by 2 area, although other sizes may be used, especially along edges of the array. The range areas are larger in size so that more intensity value information is contained within a range area than the domain area. This additional information is incorporated in interpolating an intensity value for the undefined element, if the range area appears to be similar to the domain area. Additionally, only those range areas which are centered about an intensity value which is for the same second color component as the center intensity value for the domain area are selected. Similarity between a domain area and range area is determined by a distance metric or the like. Preferably, an L2 measurement is used although other distance measurements may be used. The L2 measurement is the sum of the squares of the absolute differences between each intensity value of the domain area and a corresponding intensity value in the range area.

So that the number of intensity values for the range area and domain areas are the same for the distance measurement, the range area intensity values are used to generate a comparison matrix. For example, the intensity values for a 3 by 3 and 4 by 4 may be represented as:

$$\begin{array}{cccccccc} & & & & & & a1 & \\ & a & & & & a2 & & a4 \\ e & & h & & b1 & & a3 & & c1 \\ b & & d & b2 & & b4 & & c2 & & c4 \\ & f & & g & & b3 & & d1 & & c3 \\ & & c & & & & d2 & & d4 \\ & & & & & & d3 & & \end{array}$$

The reduction of the 3 by 3 matrix to a comparison matrix is done by determining a weighted average for each corner. For example, the top corner value may be: $(2a+e+h)/4$. Similarly, the other corners may be determined. After the intensity values are determined, the absolute values of the differences between the intensity values of the comparison matrix and corresponding intensity values of the domain area are summed to determine the difference measurement. For the 4 by 4, the difference measurement is determined as:

$$(a1+a2+a3+a4-4A)^2 + (b1+b2+b3+b4-4B)^2 + (c1+c2+c3+c4-4C)^2 + (d1+d2+d3+d4-4D)^2 + (4(s1-s2))^2$$

when A, B, C and D represent the intensity values of a 2 by 2 domain area and s1 and s2 represent the intensity values for the same second color component located at the center of the domain area and the range area.

Preferably, the method of the present invention includes the transformation of each range area which may be defined within the color component array to generate additional range areas not explicitly defined by the intensity values in the array. Exemplary transformations for intensity values A, B, C and D defining a range area are shown in FIG. 3. These types of range transformations may be used in larger range areas to greatly increase the number of range area candidates which may be matched to a domain area. Preferably, all range areas of one orientation are evaluated and then the entire array is rotate so the selection of range areas results in rotated range areas. Alternatively, each selected range area may be rotated and each rotation evaluated. Additionally, the intensity values of the range areas may be further modified by multiplying them by a scaling factor p to generate even more range areas. Preferably, $p \leq 1$ to constrain or contract the intensity values which define a range area. Preferably, all range areas and rotations are selected from the array and evaluated. The intensity values of the array are then adjusted with the scaling factor and the range areas and rotations are evaluated again. For example, range areas where p=1 are evaluated prior to range areas where p=½ are generated.

Additionally, a factor q may be used to shift the intensity values of a range area. Most preferably, q is a value which is the difference between the mean value of the intensity values for the domain area and the mean value of the intensity values for a range area.

Figure 4:
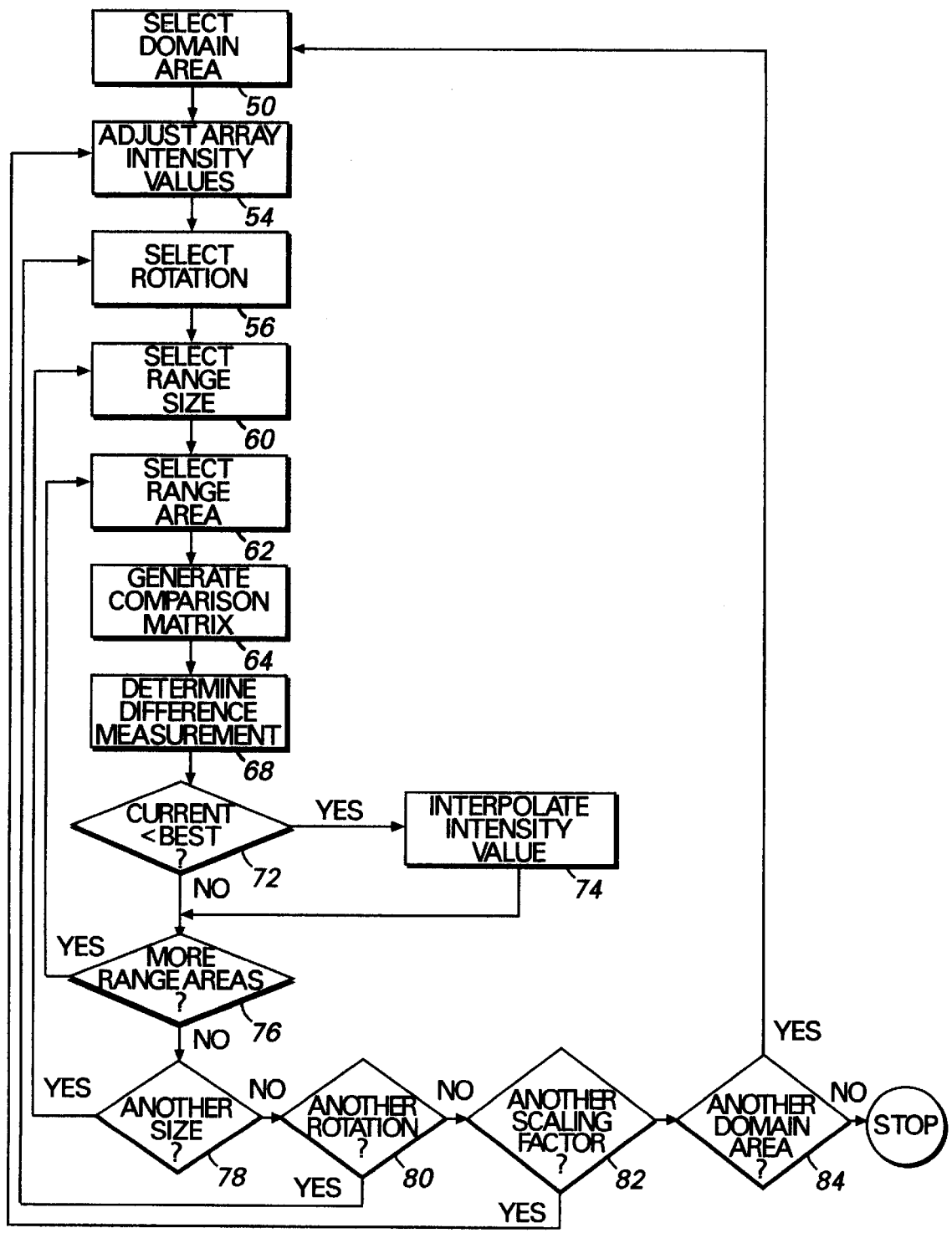
FIG. 4 is a flowchart of a method for interpolating intensity values for a color component array.

The method of the present invention is shown in FIG. 4. The method begins by selecting a domain area in a color component array (Block 50). Preferably, the mean average of the selected domain area is also computed. The intensity values of the color component array are then, preferably, adjusted using the scaling factor p (Block 54). A rotation is then selected and applied to the intensity values of the color component array (Block 56). Of course, one possible rotation is 0°. A range size is then selected which is larger than the selected domain area (Block 60). A range area is then selected (Block 62) and a comparison matrix generated (Block 64). Preferably, generation of the comparison matrix includes determining the mean average of the range area intensity values. The shifting factor q is then computed as a difference between the mean average of the domain area and the range area. The q factor is then used to adjust the intensity values of the domain area or the range area so they are closer to one another. The difference measurement is then determined (Block 68) and compared to the best difference measurement is less than the best difference measurement (Block 72), an interpolated intensity value is determined (Block 74). Otherwise, a check for more range areas occurs (Block 76). If more range areas exist, the process continues. Otherwise, there is a check for another range size to process (Block 78) and processing continues for the next range area size. If there are no other range area sizes to process, range rotation is checked (Block 80). This check is followed by a check for another scaling factor (Block 82). Once all of the range areas for each size, rotation, and scaling factor have been processed, the interpolated value is stored in an array for the completed color component array. Processing then continues for the next domain area (Block 84).

The interpolated value may be an average of intensity values from the range area or acceptance of an intensity value from the range area. For example, in a 4 by 4 range area, the interpolated value is an average of the four centermost intensity values which are preferably adjusted by the shifting factor q. After the interpolated value and associated difference measurement are stored as the best determined thus far, the process continues.

While the present invention has been illustrated by a description of preferred and alternative embodiments and processes, and while the preferred and alternative embodiments processes have been described in considerable detail, it is not the intention of the applicants to restrict or in any way limit the scope of the appended claims to such detail. Additional advantages and modifications will readily appear to those skilled in the art.

What is claimed is:

1. A method for interpolating intensity values for an array element of a first color component array for which an intensity value for a second color component was sensed, comprising the steps of:

selecting a domain area in a first color component array defined by a predetermined number of intensity values for a first color component centered about an undefined array element;

selecting a plurality of range areas in said first color component array, said range areas being larger than said domain area;

determining a difference measurement between said domain area and each of said range areas in said plurality of range areas;

selecting a range area corresponding to a smallest difference measurement; and interpolating an intensity value for said first color component for said array element about which said domain area is centered, said interpolated value being interpolated from said intensity values for said first color component of said selected range area.

2. The method of claim 1 wherein said plurality of range areas include rearrangements of said intensity values in said range areas within said color component array.

3. The method of claim 1 wherein said intensity values of said plurality of range areas are modified by a scaling factor to generate range areas other than those contained in said color component array.

4. The method of claim 1 wherein said range areas of said plurality of said range areas are one of a 4 by 4 or 3 by 3 size.

5. The method of claim 1 wherein said intensity values for each said range area of said plurality used to determine said difference measurement are averages of intensity values proximate a corner of each said range area.

6. The method of claim 5 wherein said average is a weighted average.

7. The method of claim 5 wherein said determining step further includes adjusting one of said intensity values of said domain area and said intensity values of each said range area with a mean difference between said domain area and said range area for which said distance measurement is being determined.

8. The method of claim 7 wherein said interpolating step further includes adjusting said interpolated value with said mean difference.

\* \* \* \* \*